United States Patent
Heyraud et al.

(10) Patent No.: US 8,065,287 B2
(45) Date of Patent: Nov. 22, 2011

(54) METHOD AND SYSTEM FOR SEARCHING AVAILABILITY OF AN ENTITY FOR PURCHASE OR RESERVATION

(75) Inventors: Jean-Noël Heyraud, Valbonne (FR); Wilfrid Johnston, Paris (FR); Tran-Dzien Nguyen, Le Cannet (FR)

(73) Assignee: Amadeus S.A.S., Sophia Antipolis Cedex (FR)

( * ) Notice: Subject to any disclaimer, the term of this patent is extended or adjusted under 35 U.S.C. 154(b) by 288 days.

(21) Appl. No.: 11/820,528

(22) Filed: Jun. 20, 2007

(65) Prior Publication Data

US 2008/0319946 A1    Dec. 25, 2008

(51) Int. Cl.
G06F 17/30    (2006.01)

(52) U.S. Cl. ........ 707/706; 707/709; 707/713; 707/721; 707/736

(58) Field of Classification Search .......... 707/3–6, 707/104.1, 706–736; 705/14
See application file for complete search history.

(56) References Cited

U.S. PATENT DOCUMENTS

| | | | |
|---|---|---|---|
| 5,021,953 A | | 6/1991 | Webber et al. |
| 6,070,158 A * | | 5/2000 | Kirsch et al. ........................ 1/1 |
| 6,307,572 B1 * | | 10/2001 | DeMarcken et al. ......... 715/763 |
| 6,760,720 B1 * | | 7/2004 | De Bellis ...................... 707/706 |
| 7,330,846 B1 * | | 2/2008 | Dirisala et al. ..................... 707/3 |
| 7,437,353 B2 * | | 10/2008 | Marmaros et al. ................ 707/3 |
| 7,668,809 B1 * | | 2/2010 | Kelly et al. .................... 707/713 |
| 7,668,811 B2 * | | 2/2010 | Janssens et al. ........ 707/999.003 |
| 7,979,457 B1 * | | 7/2011 | Garman .......................... 707/768 |
| 2001/0054020 A1 * | | 12/2001 | Barth et al. ...................... 705/37 |
| 2004/0122807 A1 * | | 6/2004 | Hamilton et al. .................. 707/3 |
| 2004/0122817 A1 * | | 6/2004 | Kaiser ............................... 707/5 |
| 2004/0143569 A1 * | | 7/2004 | Gross et al. ....................... 707/3 |
| 2004/0249684 A1 | | 12/2004 | Karppinen |
| 2005/0033616 A1 | | 2/2005 | Vavul et al. |
| 2005/0262064 A1 * | | 11/2005 | Lavin ................................ 707/3 |
| 2006/0053120 A1 * | | 3/2006 | Shum et al. .................... 707/100 |
| 2007/0043750 A1 * | | 2/2007 | Dingle .......................... 707/101 |
| 2007/0214179 A1 * | | 9/2007 | Hoang ........................ 707/104.1 |
| 2008/0005118 A1 * | | 1/2008 | Shakib et al. ................... 707/10 |
| 2008/0222105 A1 * | | 9/2008 | Matheny ........................... 707/3 |

FOREIGN PATENT DOCUMENTS

| | | |
|---|---|---|
| EP | 1684230 | 7/2006 |
| WO | WO2006/002480 | 1/2006 |

* cited by examiner

*Primary Examiner* — Hanh Thai
(74) *Attorney, Agent, or Firm* — Drinker Biddle & Reath LLP

(57) ABSTRACT

A method of searching for availability of an entity for purchase or reservation. The method comprises the steps of searching for an entity matching a search criterion to obtain a list of entities, wherein the or each entity comprises a parameter having a predetermined availability; automatically searching for one or more available parameters associated with the or each entity at substantially the same time; incrementally generating a list of each entity and one or more available parameters associated therewith to generate a list of entity and available parameters as the automatic search provides one or more results, and displaying the list as it is generated for selection by a user of a predetermined combination of entity and parameter.

13 Claims, 8 Drawing Sheets

FIG. 3

1. Search    2. Hotels    3. Traveller    4. Reservation

Search View search form

| Listing view | Detailed view | Map view | sort by: None selected
Results: 5 Hotels

| Hotel Name | From Price/night | Distance from City center | | |
|---|---|---|---|---|
| ☐ Cosmopolitan Hotel, Tourist, Luxe Hospitality, NEW YORK | 175 USD (540 ARS) | 0.3 km West | ❄ | Hide rates |

Distance in: km

Room | From Price/night | Estimated Price | | |
---|---|---|---|---
Seasonal special Superior room w-1 double bed air conditioning Private bath dataport ceiling fan | 175 USD (540 ARS) | 175 USD (540 ARS) | Deposit Conditions | Book
Seasonal special Superior room w-2 double bed air conditioning Private bath dataport ceiling fan | 199 USD (614 ARS) | 199 USD (614 ARS) | Deposit Conditions | Book
Corporate rate Superior room w-1 double bed air conditioning Private bath dataport ceiling fan | 175 USD (540 ARS) | 175 USD (540 ARS) | Deposit Conditions | Book

| ☐ Embassy Stes New York, First Class, Embassy Suites, NEW YORK | 249 USD (769 ARS) | 0.4 km West | ❄ | Hide rates |

Room | From Price/night | Estimated Price | | |
---|---|---|---|---
Best available rate 2 room suite-2 double beds-nonsmoking | 439 USD (1356 ARS) | 439 USD (1356 ARS) | Guarantee Conditions | Book
Best available rate 2 room suite-1 king bed-nonsmoking | 439 USD (1356 ARS) | 439 USD (1356 ARS) | Guarantee Conditions | Book
Best available rate 2 room suite-1 king bed-smoking | 439 USD (1356 ARS) | 439 USD (1356 ARS) | Guarantee Conditions | Book More Rates Last Searches (8) »»
Saved Hotels (0) »»
Filter your results »»
Active filters:
Distance »»
Hotel Category »»
Hotel Chain »»
City »»
Location »»

Searching:
59 Hotels
More Hotels

METHOD AND SYSTEM FOR SEARCHING AVAILABILITY OF AN ENTITY FOR PURCHASE OR RESERVATION

FIELD

This disclosure relates to a method and system for searching for availability of an end user entity for purchase, reservation or the like, such as online checking and booking of travel products and services in the travel industry (for example, searching for room availability in a hotel or searching for availability of an apartment, a vehicle or a seat).

BACKGROUND

There are many kinds of booking system in the travel industry or in the entertainment industry, which allow a user to find a specific seat or room by means of a searching system. For example, in the travel industry, if the user wants to book a room in a hotel through a website, the process is as follows. At first, the user has to enter criteria in the required fields on the website in order to launch a first request to obtain a corresponding list of hotels matching the criteria. Thus the booking system displays an exhaustive list of all hotels matching the criteria. These hotels generally have at least one available room. The list of the hotels comprises the name of the hotels and a price per night, which is an indication price. This indication price, also called the "starting from" price, is a specific price dedicated to the online booking engine being used. If the user wants to check if other prices are available outside the particular online booking prices, the user must send a new request to each hotel in the list of hotels to obtain for each hotel the other rates and corresponding services if required. This process is a sequential process which has many drawbacks for the booking system and the user. In fact, this sequential search requires a significant amount of time to display the first list of all matching hotels at a first time. Also, the server at the booking system needs to be able to manage a significant amount of data in order to display the whole list of results or hotels that match the search criteria.

Certain solutions exist in order to limit the amount of displayed hotels in the results list. US 2004/0249684 describes a solution where the booking system always stores availability data sent by the in-house booking system of a specific hotel. Thus when a user makes a request, the results presented show a combination of the hotel chosen and a corresponding available room in the result list. The available room may also have an indication of a specific rate and available services at the hotel. However, there is only one price displayed for each hotel, which is generally the lowest applicable price. Furthermore, as the booking system of a specific hotel only transmits availability data through a polling communication, the user may encounter discrepancies whilst selecting the rate. In fact the rate may no longer be available or the prices may have changed and the user has to re-check the real time availability information for the selected room. Therefore the user may not always have the correct availability information or it may require additional time to obtain this information. The user may also not have all the available rates for each hotel.

SUMMARY

An object of the method and system for allowing searching for availability of an end user entity is to overcome at least some of the problems associated with the prior art.

According to one aspect, there is provided a method of searching for availability of an entity for purchase or reservation, wherein said method comprises the steps of searching for an entity matching a search criterion to obtain a list of entities, wherein the or each entity comprises a parameter having a predetermined availability; automatically searching for one or more available parameters associated with the or each entity at substantially the same time; incrementally generating a list of each entity and one or more available parameters associated therewith to generate a list of entity and available parameters as the automatic search provides one or more results; displaying the list as it is generated for selection by a user of a predetermined combination of entity and parameter.

According to another aspect, there is provided a system for searching for availability wherein the system comprises a search module for searching for an entity matching a search criterion to obtain a list of entities, wherein the or each entity comprises a parameter having a predetermined availability and automatically searching for one or more available parameters associated with the or each entity; a memory module for incrementally generating a list of each entity and one or more available parameters associated therewith to generate a list of entity and available parameters at substantially the same time; a display for displaying the list as it is generated by the memory module for selection by a user of a predetermined combination of entity and parameter.

BRIEF DESCRIPTION OF THE DRAWINGS

Reference will now be made, by way of example, to the accompanying drawings, in which:

FIG. 3 is a screen print of the displayed results in accordance with the disclosed embodiment, given by way of example.

DETAILED DESCRIPTION OF THE DISCLOSED EMBODIMENTS

The method and system disclosed and described is directed to a user who may want to book, reserve or purchase a seat in a train, in an airplane, in a theatre, a room in a hotel or car for rent for example. The method and system will be described with reference to the example of an availability search for an entity such as a room in a hotel. This availability search can be a positive availability search or a negative availability search. A positive availability means the presence of an item. A negative availability means the absence of an item. The method will be described with reference to a positive availability.

Figure 1:
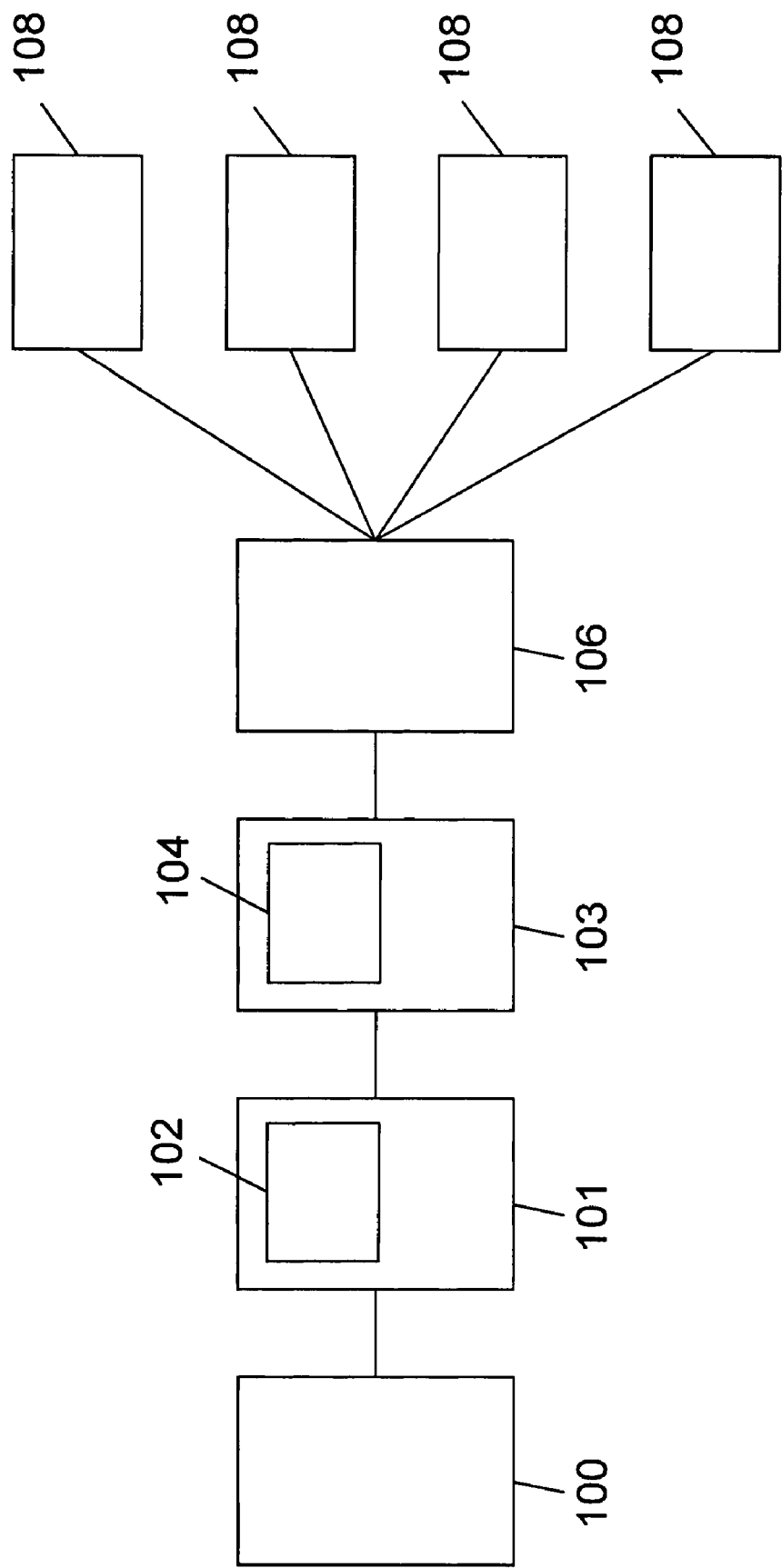
FIG. 1 is a schematic diagram of the different modules to carry out the method in accordance with one embodiment of the method and system disclosed herein, given by way of example.

As shown in FIG. 1, a computer 100 is connected to a web site of a web server or to a client machine 101 of a sales or reservation interface 102. The web server can be a server of a travel agency or any other appropriate server. In order to launch an availability search to find an available room in a hotel, a user selects and enters criteria on the website in order to effect the search. This will be described in greater detail below.

The sales or reservation interface comprises an application which deals with requests from the user. The sales or reservation interface is for example the front end of a GDS (Global Distribution System) as will be described later. The sales or reservation interface receives requests from the user and transmits them to a host machine 103 of a programming interface 104. The programming interface 104 acts as a business logic module or a business connector application. The programming interface can deal with requests or data from the sales or reservation interface application in order to carry them out. The programming interface comprises a module to carry out requests in a way to be described later. After dealing with requests, the programming interface sends requests to a server machine 106 of the GDS. The GDS carries out requests from the programming interface. The GDS can also be replaced with another kind of system if the domain is different from the travel domain. The GDS 106 has connections with databases 108. The databases are databases from airlines, theatres or hotels for instance. The databases comprise all data related to date, location, rates, etc for each kind of product or service that is being sought. The GDS 106 can send requests to the databases 108 and then return results to the programming interface 104. The programming interface can then post results of the request in a specific queue or module inside the programming interface in order to display results for the sales or reservation interface application. At the end of the process the user can see results matching the request on the computer 100.

The actions relating to searching are carried out by a combination of features of the FIG. 1 system so as to provide a searching module. Similarly the actions relation to storing and displaying the results are carried out by a combination of features of the FIG. 1 system, so as to provide a memory module.

Figure 2:
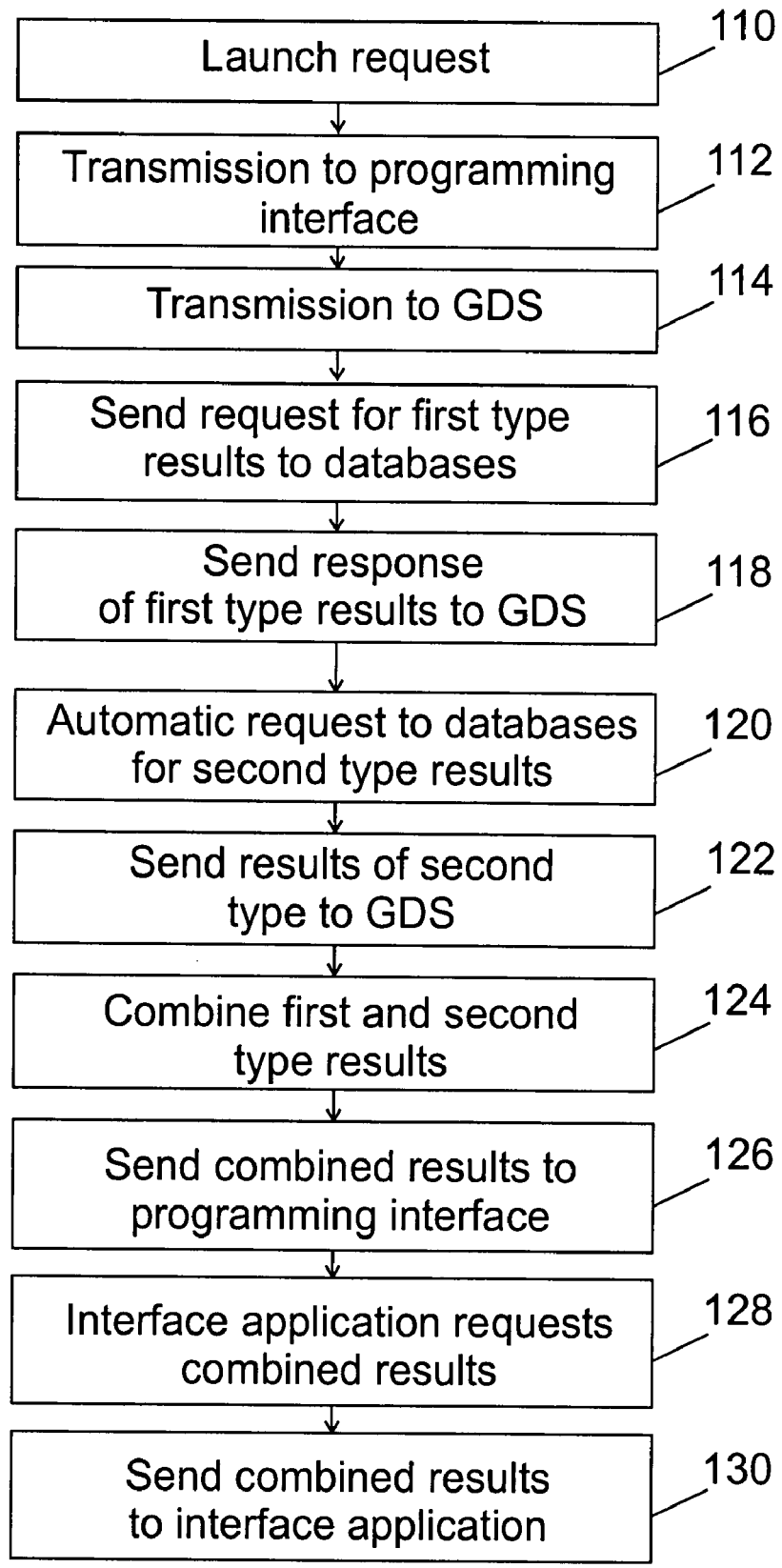
FIG. 2 is a flow chart of the method steps in accordance with the disclosed embodiment, given by way of example.

As shown in FIG. 2, the details of the steps of the method will now be described. In a first step 110, the user launches a first type of request from a web page of the sales or reservation interface. The user has to choose or enter at least one specific criterion on the web page. The criterion can be a specific city or a distance to the centre of the city for example. As an example, the user may request a search with one criterion that is related to a specific location of a hotel. After the user launches the search, the search goes to the programming interface 104 in a step 112. The programming interface 104 deals with the request in order to transmit the request to the GDS system in a step 114. In a step 116, the GDS system deals with the request by requesting data from the databases 108. For example, if the criterion of the request of the user is a specific city, the GDS system requests databases 108 to check the availabilities for any hotel located in the requested city.

After databases 108 return first results in a step 118, the GDS 106 stores a first type of results list. The results comprise a list of hotel matching the criterion of the request made by the user. In the cited example of the request of the user, the first type of results comprises a set of between 2 to 8 hotels matching the request of the user. The set of 2 to 8 hotels belongs to a total list of 50 hotels, for example matching the request. The number of results depends on the setting of the time of response of the GDS or any other appropriate parameter of the system or GDS.

After the GDS 106 receives the first set of first type results, an automatic search defined as a second type of search occurs in a step 120. In fact the GDS launches this second search to databases 108 through a search module. This second type of request needs no input from the user. With this second type of request, the GDS requests the databases 108 to search for second type of results which comprise descriptive properties of the available room for all the hotels of the first type result list. The descriptive properties or parameters can include rate codes, prices and the description of the services available at the corresponding hotels of the first results list or any other parameters.

Figure 2A:
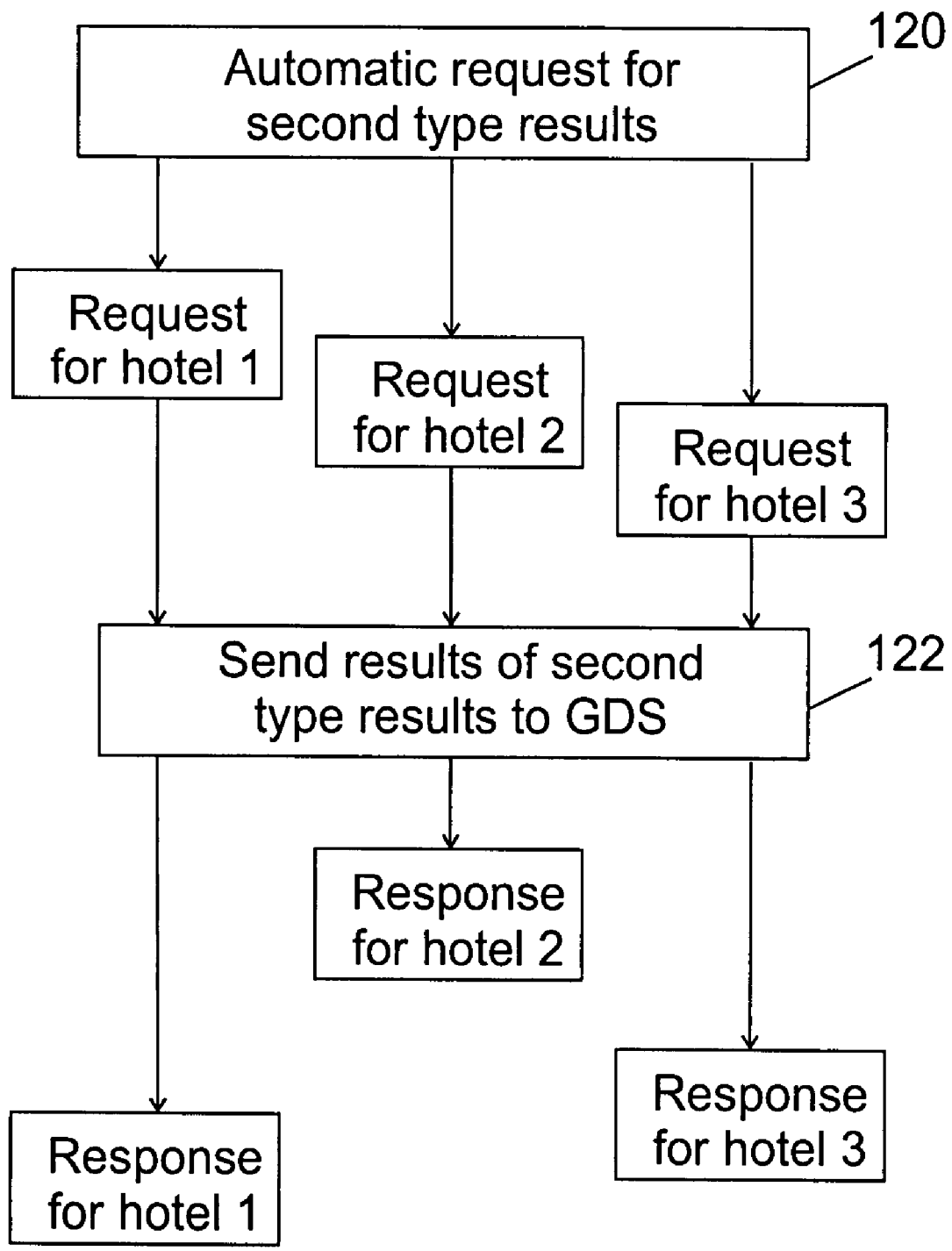
FIG. 2a is a flow chart of the method steps in accordance with the disclosed embodiment, given by way of example.
Figure 4:
FIG. 4 is a screen print of the displayed results in accordance with the disclosed embodiment, given by way of example.
Figure 5:
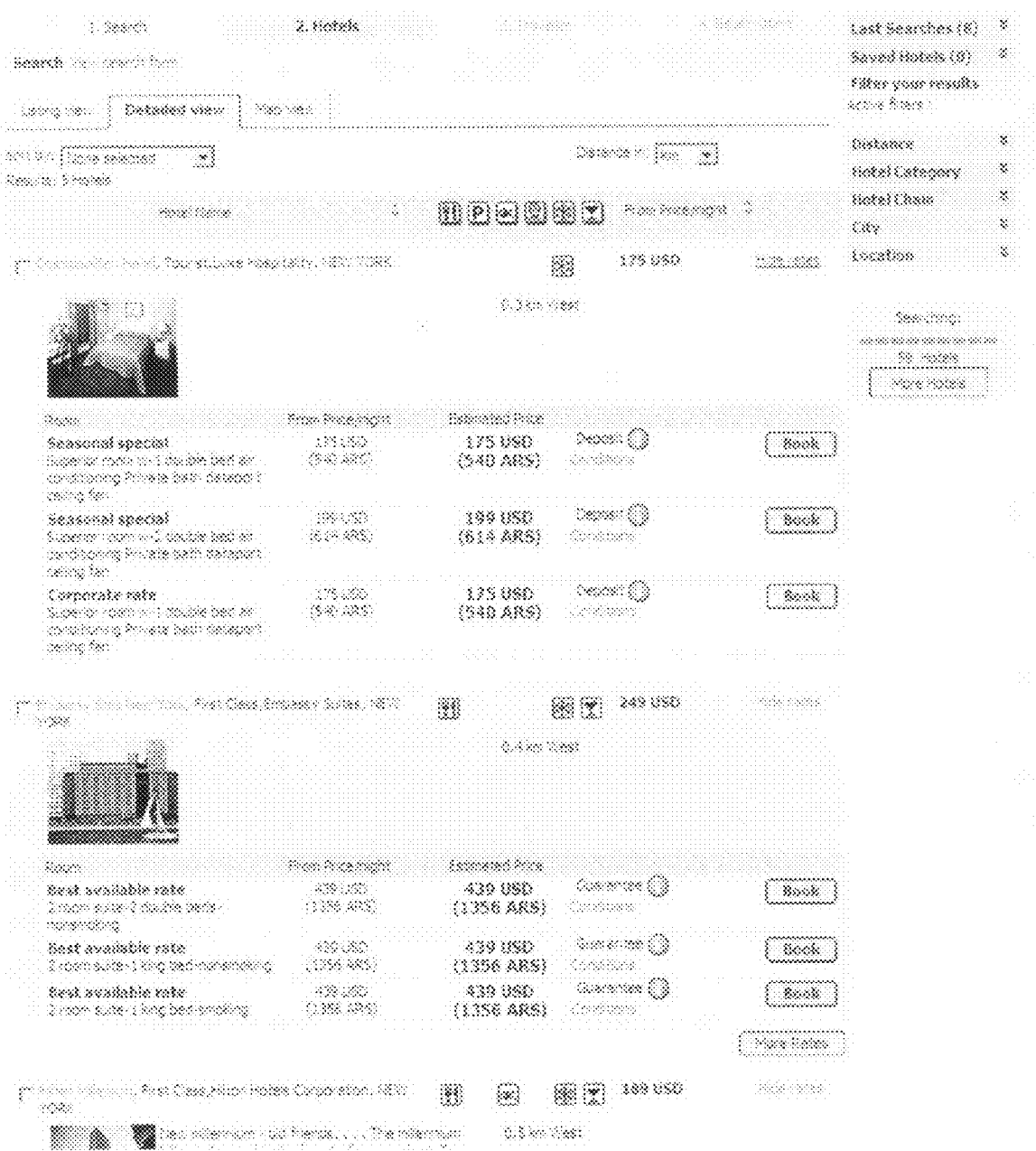
FIG. 5 is a screen print of the displayed results in accordance with the disclosed embodiment, given by way of example.
Figure 6:
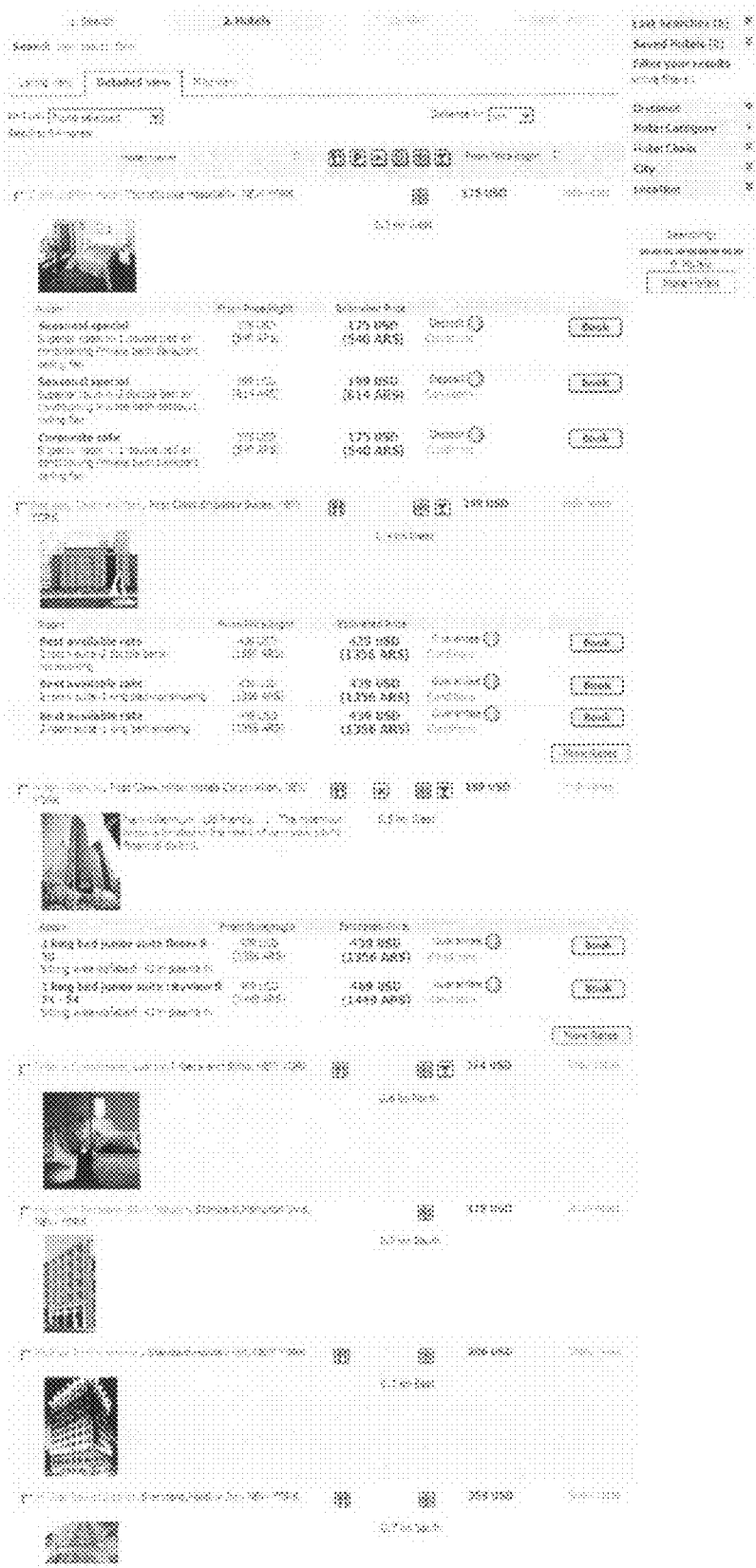
FIG. 6 is a screen print of the displayed results in accordance with the disclosed embodiment, given by way of example.
Figure 7:
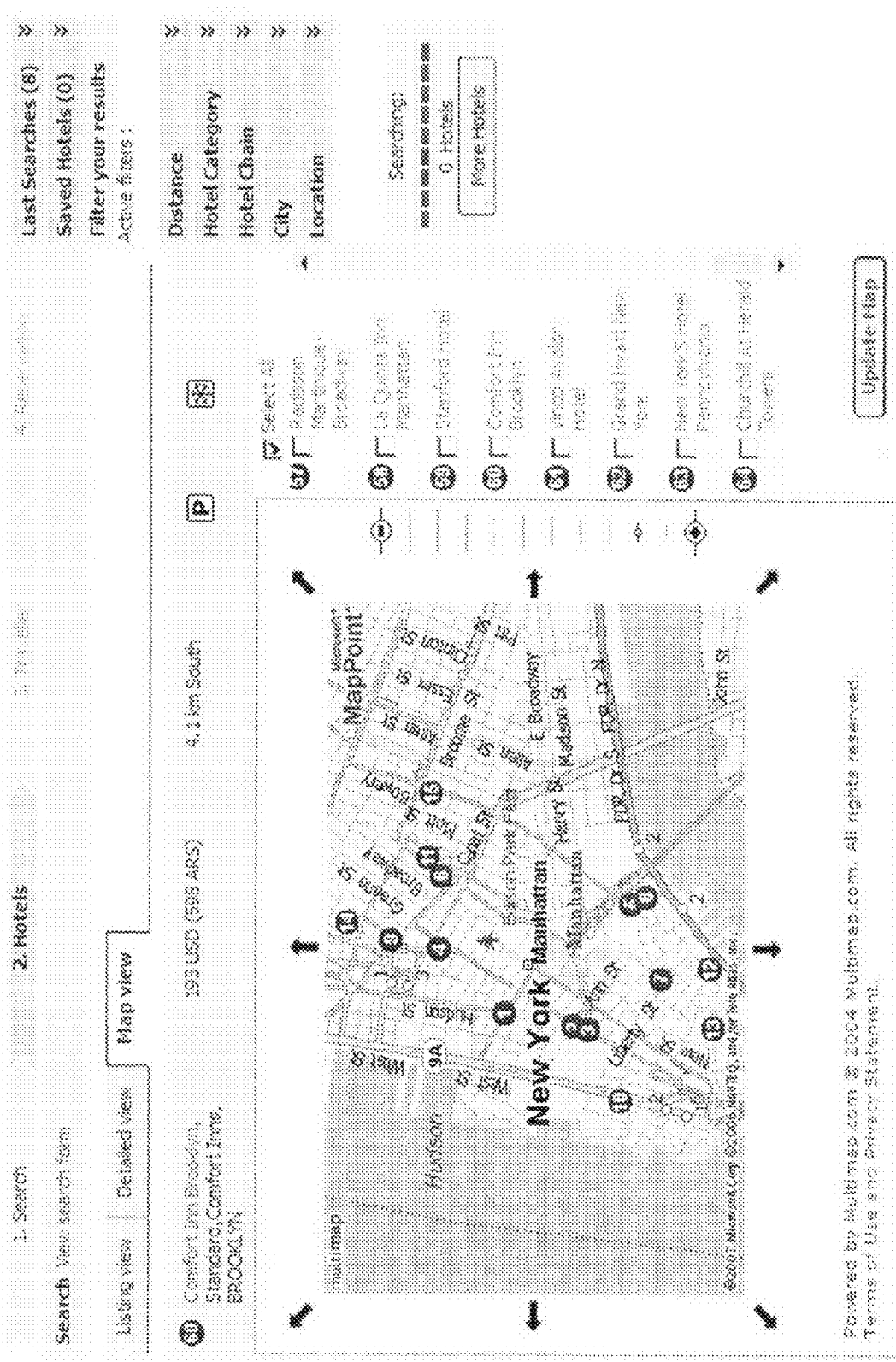
FIG. 7 is a screen print of the displayed results in accordance with the disclosed embodiment, given by way of example.

These second type of results relate to each hotel from the first results list. In the example the first list comprises 2 to 8 hotels which means that the GDS sends 2 to 8 second type of requests to databases 108 at substantially the same time. In other words, substantially the requests in accordance with the present invention occur simultaneously rather than sequentially. In a step 122 each database 108 sends a response to the GDS once the request has been attended to. Each response arrives in parallel with other responses and each response arrives within a delay, but not a uniform delay. Thus the responses may not arrive in an order which corresponds to the order of the corresponding requested hotels. For example, as shown in FIG. 2a, a request may ask for availability firstly for hotel number 1, then hotel number 2 and thirdly hotel number 3. The corresponding responses or second type of responses may arrive in another order for example firstly for hotel number 2, then for hotel number 3 and thirdly for hotel number 1. Therefore the GDS has to deal with two types of information, a first type related to hotels having a room or an entity that is available and a second type related to descriptive properties or parameters for each entity. Then in a step 124, the GDS combines both types of information in order to obtain a list of combined results. In order to obtain such a combination, a memory module allows the generation of a list of each entity or availability of a room for a specific hotel with the corresponding parameter or descriptive property.

In a step 126, the GDS sends the combined results to the programming interface. The programming interface comprises a module comprising a queue such as Java Message System (JMS) queue. This module is a modification to existing programming interfaces. The module is able to deal with several requests and results as will be described below. If the user stops the process or if a new first type of request occurs, the module removes all the results stored. The programming interface comprises the module and thus the programming interface is able to store the combined results in a waiting queue while waiting for the reservation interface to request for the results, as will be described later.

The sales and reservation interface periodically makes a request in a step 128 to the module for any waiting combined results related to the request of the user. If any combined results are waiting in the queue, the programming interface sends the combined results to the sales and reservation interface in a step 130. The time period in which this occurs is a configurable parameter of the sales and reservation interface. The sales and reservation interface can then display the combined set of results to the user on the web site.

The above described part of the method concerns the first set of 2 to 8 hotels. In fact while dealing with the second type of requests, the GDS will receive further sets of first type of response relating to hotels matching the request of the user (i.e. those outside the first set of 2 to 8 hotels). These steps occur until the GDS launches the last request of the first type for the last hotel, e.g. number 50, matching the request of the user. The GDS carries out this search through a search module. Therefore the GDS is able to send the second type of request, receive the second type of results and also receive the first type of response all in parallel. The GDS thus incrementally receives responses from the databases and the generation of a list of combined results also occurs incrementally. Therefore the waiting queue of the module also stores the combined list with new combined results in an incrementally manner. Thus the end user can visualize incrementally results matching the criterion or criteria of the request. This speeds up the process for the user and allows selection to occur more efficiently. On the computer 100 of the user, a display shows the first result list which comprises a number of hotels from the 2 to 8 hotels as mentioned above. The result list may form part of a website or webpage or be any other format. Each line of the list displays a hotel name with the different rates or prices related to available rooms. For instance one hotel may have three available standard rate rooms and one available flexible rate room. This means that the user can see the available rooms or available entities with all the different rates or prices in a defined combination. The displayed rates do not only relate to one specific online booking rate as is known in prior art. Instead, in the present invention, the user can access any available rate in order to have all availabilities at all rates. The user can either wait for other results to be displayed or click on a specific hotel having an appropriate combination of available room or entity and parameters or descriptive properties in the combined results.

The action of the updating list stops either when the GDS has processed the whole list of first type of results or if the user stops the search in any appropriate way. The results are displayed as they arrive. The user may wait for other results in which case a new list of hotels appears either automatically or by clicking on an "add results" button. The previous and new lists may be displayed together or separately, one may replace the other. If the user clicks on a specific hotel name, the user is able to see further details such as the website of the hotel for example. Thus the user can start working on the result set (i.e. by looking at hotel properties, maps, booking a room, etc.) without waiting for the queuing mechanism to be completed. The method proposes three different modes by which the user can customise the manner in which the results are presented. The three different modes are: manual, semi-automatic and automatic and all will be described below.

The manual mode is a mode where the end-user has the full control of the incremental load of the results that are displayed:

0 to i results are loaded upon any page load;

j results are then retrieved, bit by bit; the user can click on "Add results" or "More hotels" button to transfer hotels to the main results panel (filters and sorting are applied automatically);

"Add results" or "More hotels" button is grayed out when there are no results to add;

"Add results" or "More hotels" button appears when j results have been downloaded, or 'no more results' message is received from the server;

Clicking on "Add results" or "More hotels" downloads another set of k results if available;

These results can be added to by using the "Add results" or "More hotels" button as before.

The semi-automatic mode is a mode where the incremental load is performed automatically and results are added to the current display (current sorting criterion is not applied). This is nearly identical to the automatic mode as will be described below, with the exception that any new results are added to the end of the results list and no filters or sorting are applied. There is an update filters/sorting button which can be used to apply filters and sorting to the results.

The automatic mode is a mode where the incremental load is performed automatically and results are merged with the current display (current sorting criterion is applied):

0 to i results are loaded upon any page load;

j results are then retrieved, bit by bit and put into the results panel immediately (filters and sorting are applied automatically);

If the 'no more results' message is received from the programming interface which hosts the specific module, the retrieval process stops. In that case, there is no "Add results" or "More hotels" button.

An overview of these different modes is shown on FIGS. 3, 4, 5, 6 and 7. In FIGS. 3, 4, 5 and 6, a first set of results is displayed on the web site. This search relates to a search of an available room in New York. If the user wants to see more results than those already displayed, the user can click on the "More Hotels" button on the right side of the screen. Thus further results are displayed as shown on FIG. 7 where available hotels and rooms may be displayed on a map view.

It should be appreciated that there are a number of alternative embodiments to the present invention other than the embodiment presented above. The system may be applied to many different searching environments where searching for different entities for purchase or reservation that may be controlled in a number of different ways. All the variations and changes that are possible are intended to fall within the spirit and scope of the disclosed method and system.

The invention claimed is:

1. A method of searching for availability of an entity for purchase or reservation, comprising:

receiving a search request from a user specifying a required entity having at least one parameter;

launching a first search for at least one entity matching the search request to obtain a first result containing a set of matching entities;

automatically simultaneously launching a second search based on the result of the first search for each matching entity of the set of matching entities to find matching entities which match the at least one parameter thereby producing a second result comprising matching entities combined with corresponding matching parameters;

storing the second result;

displaying the second result to the user to enable the user to select a predetermined combination of entity and parameter;

continuing to incrementally collect first results from the first search and launching in parallel said second searches as soon as the first results are obtained;

updating the stored second result as new matching entities with corresponding matching parameters are found;

periodically updating the displaying of the second result to the user, until a predetermined state is reached.

2. A method as claimed in claim 1, wherein displaying the second result comprises displaying at least one descriptive property associated with each entity of the second result.

3. A method as claimed in claim 1, wherein the step of searching for at least one entity comprises requesting a database to obtain a set of entities matching the search request.

4. A method as claimed in claim 1, wherein the step of launching a first search comprises searching for an entity related to a hotel.

5. A method as claimed in claim 4, wherein the step of launching a first search comprises searching for a room in the hotel.

6. A method as claimed in claim 1, wherein displaying the second result comprises displaying a price of each entity of the second result.

7. A method as claimed in claim 1, wherein the step of automatically launching simultaneous second searches comprises launching simultaneous second searches based on an instruction from a server.

8. A method as claimed in claim 1 wherein the step of automatically launching simultaneous second searches comprises launching simultaneous second searches based on an instruction from a user.

9. A system comprising:
 a computer-implemented search module for:
  launching a first search for at least one entity having at least one parameter by matching a search request received from a user to obtain a first result containing a set of matching entities;
  automatically simultaneously launching a second search based on the result of the first search for each matching entity of the set of matching entities to find matching entities which match the at least one parameter to thereby produce a second result comprising matching entities combined with corresponding matching parameters; and
  continuing to incrementally collect first results from the first search and launching in parallel the second searches as soon as the first results arc obtained;
 a memory for:
  storing the second result; and
  updating the stored second result as new matches arc found;
 a computer-implemented interface module for periodically requesting the stored second result;
 a display for periodically displaying the requested second result for selection by the user of a predetermined combination of entity and parameter.

10. A computer readable storage medium storing computer instructions which, when read by a computer, cause the computer to search for availability of an entity for purchase or reservation by a method comprising:
 receiving a search request from a user specifying a required entity having at least one parameter;
 launching a first search for at least one entity matching the search request to obtain a first result containing a set of matching entities;
 automatically simultaneously launching a second search based on the result of the first search for each matching entity of the set of matching entities to find matching entities which match the at least one parameter thereby producing a second result comprising matching entities combined with corresponding matching parameters;
 storing the second result;
 displaying the second result to the user to enable the user to select a predetermined combination of entity and parameter;
 continuing to incrementally collect first results from the first search and launching in parallel said second searches as soon as the first results are obtained;
 updating the stored second result as new matching entities with corresponding matching parameters arc found;
 periodically updating the displaying of the second result to the user, until a predetermined state is reached.

11. The method of claim 1, wherein the predetermined state occurs when the user selects one of the combinations of entity and parameter.

12. The method of claim 1, wherein the predetermined state occurs when a predetermined number of searches has been completed.

13. The method of claim 1, wherein the predetermined state occurs when a predetermined length of time has elapsed since the first search was launched.

* * * * *